United States Patent
Gonzalez

(10) Patent No.: US 11,200,235 B1
(45) Date of Patent: Dec. 14, 2021

(54) METHOD AND SYSTEM FOR IMPROVING PERFORMANCE OF AN ISSUE MANAGEMENT SYSTEM

(71) Applicant: UIPCO, LLC, San Antonio, TX (US)

(72) Inventor: Juan Jose Gonzalez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 216 days.

(21) Appl. No.: 16/456,160

(22) Filed: Jun. 28, 2019

Related U.S. Application Data

(60) Provisional application No. 62/751,003, filed on Oct. 26, 2018.

(51) Int. Cl.
  *G06F 16/2453* (2019.01)
  *G06F 16/248* (2019.01)

(52) U.S. Cl.
  CPC ...... *G06F 16/24542* (2019.01); *G06F 16/248* (2019.01)

(58) Field of Classification Search
  CPC ...... G06F 16/221; G06F 16/252; G06F 16/27; G06F 16/278; G06F 16/24542; G06F 16/248
  See application file for complete search history.

(56) References Cited

U.S. PATENT DOCUMENTS

| | | | | |
|---|---|---|---|---|
| 6,292,800 B1* | 9/2001 | Eldreth | ............... | G06F 16/27 707/769 |
| 6,484,160 B1* | 11/2002 | Richard | ............... | G06F 16/289 |
| 6,772,164 B2* | 8/2004 | Reinhardt | ............. | G06F 16/221 |
| 8,204,809 B1* | 6/2012 | Wise | ................ | G06Q 40/06 705/35 |
| 10,268,704 B1* | 4/2019 | Sanderson | ............. | G06F 16/27 |
| 2004/0015909 A1* | 1/2004 | Cho | .................. | G06F 16/319 717/143 |
| 2009/0254393 A1* | 10/2009 | Lollichon | .............. | G06Q 10/10 705/34 |
| 2010/0223211 A1* | 9/2010 | Johnson | ................ | G06Q 40/00 706/11 |
| 2013/0097157 A1* | 4/2013 | Ng | ....................... | G06F 16/248 707/723 |
| 2017/0344588 A1* | 11/2017 | Horowitz | ............ | G06F 16/2228 |

* cited by examiner

*Primary Examiner* — Jorge A Casanova
(74) *Attorney, Agent, or Firm* — Plumsea Law Group, LLC

(57) ABSTRACT

A system and method for improving the performance of an issue management system is disclosed. The system includes a server communicating with an issue management database and a client running on a remote device such as a mobile phone. The client provides a user interface for making queries of the issue management database. Users can select filtering parameters to narrow the query space. Upon receiving a user query the system can request information from server and the issue management database related to the query and the filtering parameters. Using the response from the server and database the client can build a partial database that is stored locally. Further user queries are performed on the partial database rather than the full server-side database to enhance performance and response time of the system.

20 Claims, 12 Drawing Sheets

FIG. 10

ISSUE DETAILS

STATUS: REMEDIATED    RATING: HIGH

1000 → 1002: 5 INITIATE | 1004: 64 PLAN | 1006: 18 MITIGATE | 1008: 72 VALIDATE | 1010: CLOSURE

GENERAL INFORMATION ⌄

ISSUE TITLE:
CRO-2017-A1 ESCALATION OF 1ST LOD INEFFECTIVE EXECUTION-17OPERATIONAL RISKMANAGEMENT-RIS [ISSUE-00003639]

| | |
|---|---|
| OWNER ORGANIZATION: | CRO |
| ASSIGNED TO: | MARK DITROLIO (PL91059) |
| ASSIGNED DATE: | 8/28/2018 |

EXECUTIVE SUMMARY:
REPORTING HAS NOT BEEN PRESENTED AT A LEVEL OF DETAIL THAT WOULD PROVIDE THE RC AND BOARD WITH AN ACCURATE PICTURE OF THE EFFECTIVENESS OF THE RCSA PRG., WHICH IMPACTS THE EMG AND BOD'S ABILITY TO PROVIDE EFFECTIVE OVERSIGHT ON THE MITIGATION OF RISKS

ISSUE DESCRIPTION: >

ISSUE PARTICIPANTS & DATES >

ADDITIONAL INFORMATION >

METHOD AND SYSTEM FOR IMPROVING PERFORMANCE OF AN ISSUE MANAGEMENT SYSTEM

CROSS-REFERENCE TO RELATED APPLICATIONS

This application claims the benefit of Provisional Patent Application No. 62/751,003, filed Oct. 26, 2018, and title "Method and System for Improving Performance of an Issue Management System", which is incorporated by reference herein in its entirety.

TECHNICAL FIELD

The present disclosure generally relates to issue management systems, and in particular, to methods of retrieving information from an issue management database.

BACKGROUND

Large organizations often use governance, risk and compliance software (GRC software) to monitor and control information and technology systems that are subject to regulations. GRC software allows organizations to perform this monitor and control at higher levels in the organization, so that similar risk and compliance issues that arise in different parts of the organization can be treated in a systematic (and more efficient) manner.

Existing GRC software is often complicated to install and use. When users pull issue records to be reviewed and acted on, the records may be displayed in raw formats that essentially mimic the way they are stored in the database. This requires users to search through records to determine important information about an ongoing issue, including how long the issue has been open and how long it has spent in various stages of a mitigation process. Additionally, for larger organizations the number of issues stored in a database may quite large, which can lead to performance issues in retrieving records, frustrating users and limiting the utility of the system.

There is a need in the art for a system and method that addresses the shortcomings discussed above.

SUMMARY

In one aspect, a method of improving the response time for queries to a database from a client running on a remote device includes steps of receiving at least one filtering parameter, submitting a request to the database, the request including the at least one filtering parameter, and receiving a response from the database. The method also includes creating a partial database on the remote device based on the response from the database, receiving a database query; and retrieving results from the partial database based on the query.

In another aspect, a method of improving the response time for queries to a database from a client running on a remote device includes the steps of submitting a request to the database, the database including a first entry and a second entry, where the first entry includes a database function that makes reference to a value stored in the second entry, and receiving a response from the database. The method also includes steps of evaluating the database function associated with the first entry to obtain a first entry result, creating a partial database on the remote device, the partial database including the first entry, and storing the first entry result in the partial database.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a schematic view of a client rendering an issue status details, according to an embodiment;

DESCRIPTION OF EMBODIMENTS

The embodiments provide a system and method for improving the performance of an issue management system that includes a server-side database and a client. Specifically, the embodiments provide a system and method for improving the response time for record retrieval based on a query of the system. This improved response time is achieved by creating a partial database that is stored locally on the client, which could be a mobile software application running on a smartphone. The partial database is created according to filtering parameters that help the system determine which records should be stored locally. Once the partial database is created, user queries are performed on the partial database rather than the complete server-side database, which reduces time spent on making calls to the server-side database. Complete control of the partial database on the client side may also allow for efficient and robust search techniques such as RegEx searches.

This improved response time is also achieved by pre-evaluating database entries and removing links or references to other entries as the data is loaded onto the client. Because function calls during data retrieval add time, especially when evaluating functions across a large number of database entries, reducing or eliminating the need to evaluate functions when returning query results reduces the response time of queries performed on the partial database.

Additionally, the embodiments provide a system and method to improve the usability of an issue management system by calculating relevant metrics on the fly (that is, as a portion of the database is loaded to the client) to be displayed in a simple and elegant format for the user. For example, the system can calculate the number of days that issues spend in different phases of the issue management lifecycle and display these numbers within the client so that users can easily determine where chokepoints in issue management workflows may be.

Figure 1:
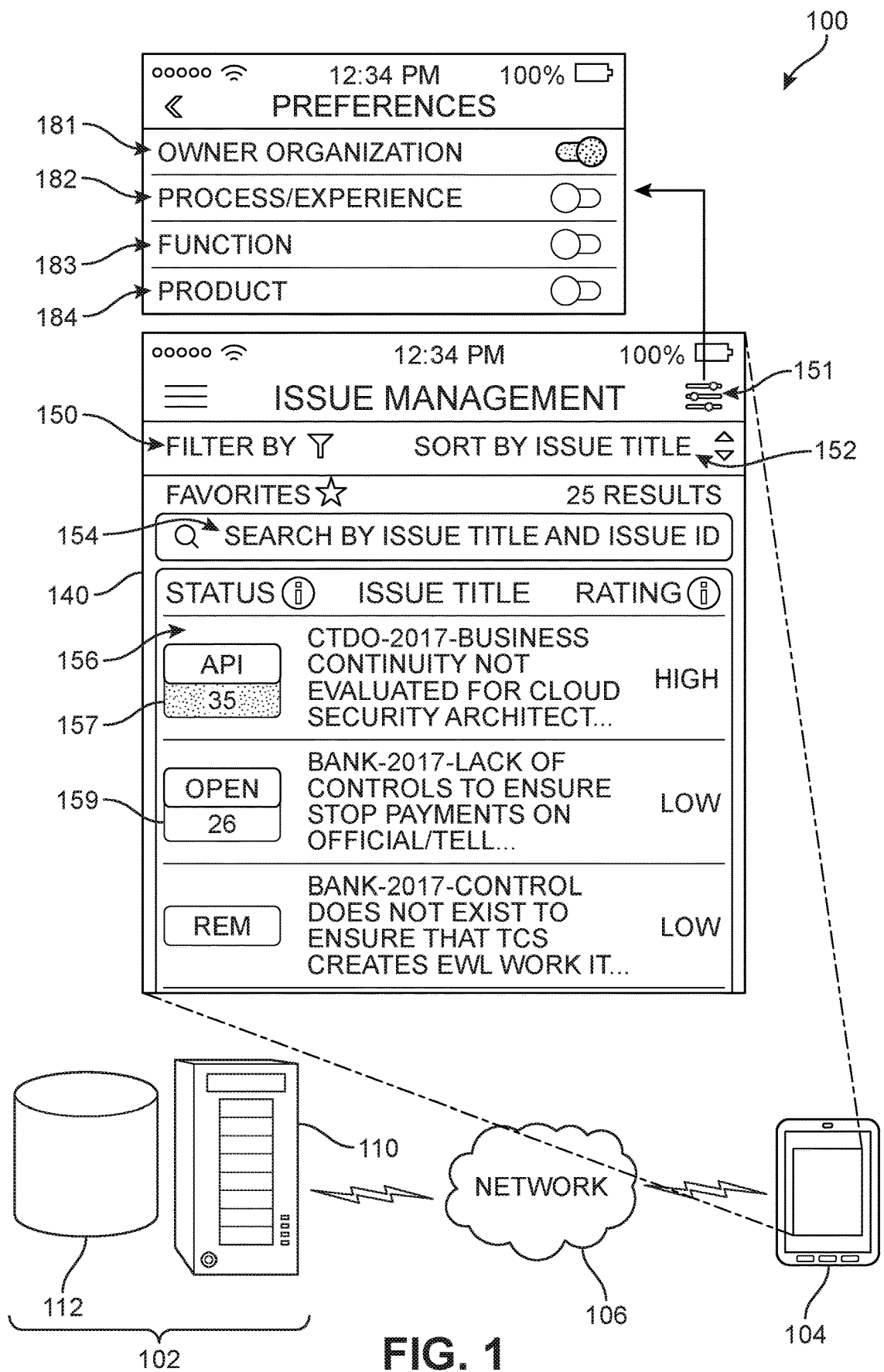
FIG. 1 is a schematic view of an issue management system, according to an embodiment.

FIG. 1 is a schematic view of an issue management system 100. Issue management system 100 may include a computer system 102 in communication with a remote device 104 through a network 106. Issue management system 100 (also referred to simply as "system 100") may be associated with an organization such as a corporation, a cooperative, a bank or any other organization. System 100 may include provisions to monitor and control issues that arise in operations of the organization, including issues related to governance, risk and compliance.

The term "computer system" refers to the computing resources of a single computer, the partial computing resources of a single computer, a plurality of computers communicating with one another, or a network of remote servers. In an exemplary embodiment, computer system 102 includes at least one server.

In the embodiment of FIG. 1, computer system 102 comprises one or more computing devices 110 (for example, a server) that may be in communication with one or more databases. In an exemplary embodiment, computer system 102 communicates with issue management database 112. Database 112 could be co-located with computing device 110 or could be a remote database that is accessible by computing device 110 over network 106. Database 112 can include any kind of storage device, including but not limited magnetic, optical, magneto-optical, and/or memory, including volatile memory and non-volatile memory.

Remote device 104 may comprise a computer system for processing and communicating information. A remote device may generally include a processor, a data storage component, and a display. A remote device may also include components to facilitate communication with external systems (for example, hardware and software components to enable communication over network 106). In some cases, a remote device includes one or more physical buttons. In some cases, a remote device includes touchscreen controls.

In the exemplary embodiment of FIG. 1, remote device 104 comprises a mobile device. Specifically, remote device 104 comprises a smartphone. In other embodiments, however, a remote device could comprise a tablet computer, a laptop, a desktop computer, or similar kind of device. In some embodiments, multiple remote devices could be used, including both smartphones and tablet devices.

A remote device and a computer system could operate in a client-server relationship. For example, computer system 102 may include a server that communicates with remote device 104 as well as other remote devices over network 106. Remote device 104 may provide the front-end (or client-side) of a system that provides the ability to retrieve, review and edit issue records. In some cases, remote device 104 may run client software through a web browser, in which case the client software may be hosted on a server associated with computer system 102. In other cases, remote device 104 may run client software in the form of a native software application that has been downloaded through a centralized marketplace (i.e., an "app store"). In some cases, native software applications could be provided for multiple kinds of devices, including both smartphones and tablets.

Operating as a client, remote device 104 may be configured with an issue management software application. An issue management software application allows a user to retrieve issue records, review the records and/or edit the records to facilitate the issue management process.

A user interface for issue management software application 140 is shown schematically in FIG. 1, as it may appear on a smartphone or tablet device. The user interface includes a filtering menu 150 ("filter by"), a preferences menu 151, a sorting menu 152 ("sort by"), a search field 154 and a results field 156. Filtering menu 150 allows a user to narrow the universe of searchable results based on various kinds of filtering parameters. Examples of filtering parameters include, but are not limited to: issues past due, risk acceptance, compliance impact, rating (or importance level), status, root cause, issue type, issue sub-type and issue owner. Additional details of these filtering parameters are discussed in further detail below. As an example, a user could use filtering menu 150 to limit searches to only issues that are past due.

Preferences menu 151 allows a user to target only issues that fall under a particular domain. In one embodiment, preferences menu 151 may have selection options allowing a user to select by: "Owner Organization" (selection 181), "Process/Experience" (selection 182), "Function" (selection 183) and/or "Product" (selection 184).

Sorting menu 152 provides options for sorting any results that are returned from a search (or query). For example, a user could select to have the results sorted by Issue Title, Status, Rating or Past Due.

Users can enter search or query parameters into search field 154. In the exemplary embodiment, application 140 prompts a user to search based on issue ID and Issue title. In some cases, a user can enter any regular expression key words for either Issue Title or Issue Id. However, a user could alternately use other kinds of search terms to search through issues.

The results returned from the search are then displayed in results field 156 (and further sorted according to any selections from sorting menu 152). In the exemplary embodiment, the status, title and rating of each result is shown in the listing of results within results field 156. Upon selecting a particular result, still further information can be displayed for a user. In some embodiments, search results may include an indication of either how many days past due an issue is, or how many days until a pending deadline for an issue. For example, past due indicator 157 shows the number "35" along with the status "API". This means that the issue is 35 days past due. As another example, coming due indicator 159 shows the number "26" along with the status "API". This means that there are 26 days until the issue is past due, or until some other deadline associated with the issue. In the exemplary embodiment, past due indicator 157 is shaded to indicate the number of days is "past due", whereas indicator 159 is not shaded to indicate that the number of days is "coming due". In some cases, these different cases ("past due" vs "coming due") could be colored differently within the application UI (for example, red for "past due" and yellow for "coming due").

In some embodiments, communication between a client and a server-side database can be mediated by one or more software applications and/or micro-services. In one embodiment, general operation of an issue management database may be handled by a GRC software application. Another server-side application or micro-service running on the server could then be used to mediate requests between the client and the GRC software, which is itself in communication with the issue management database. Alternately, a server-side program (or micro-service) mediating information exchange with a client and an issue management database could run independently of existing GRC software.

Figure 2:
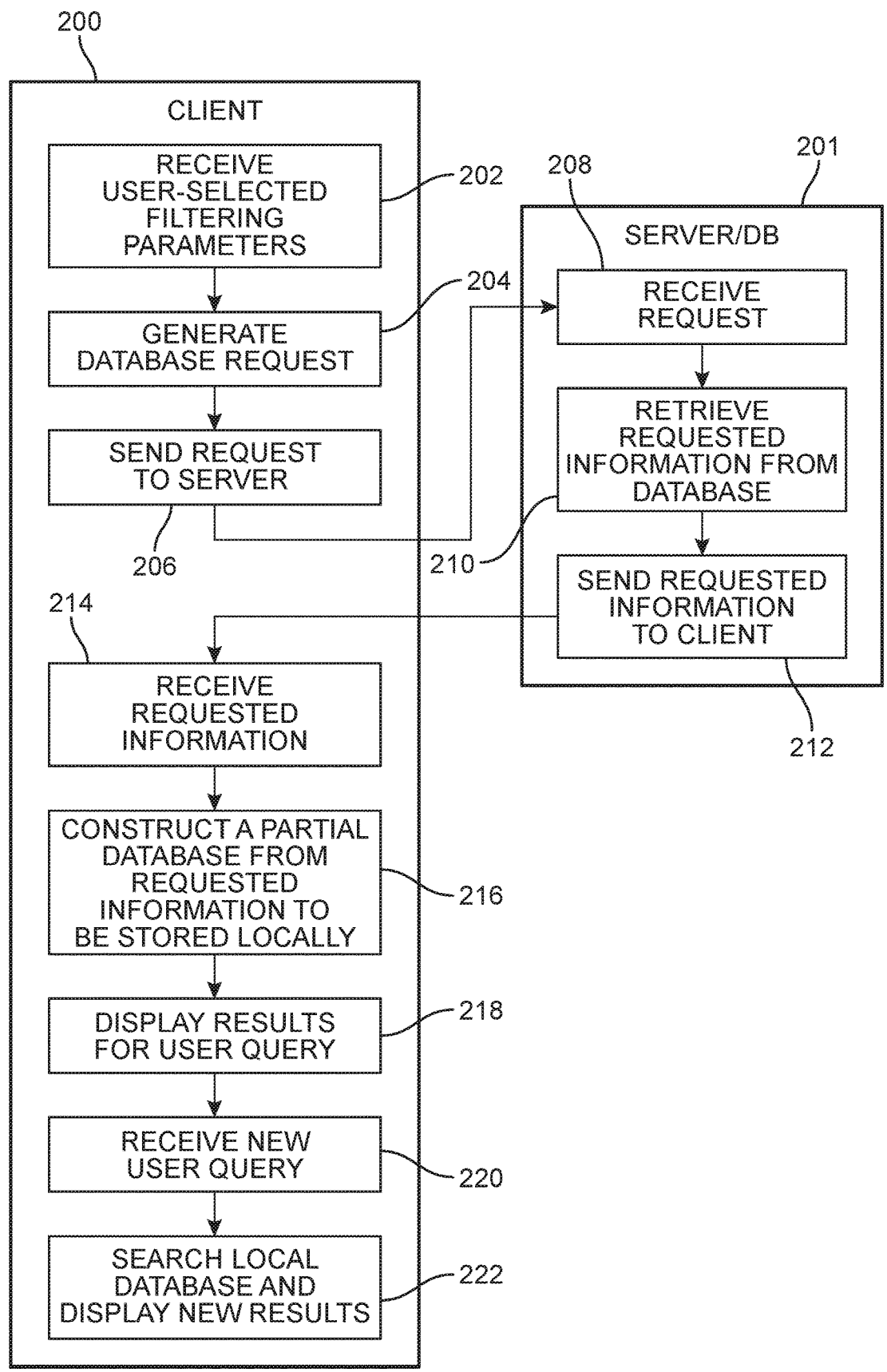
FIG. 2 is a schematic view of a process between a client and server of an issue management system, according to an embodiment.
Figure 3:
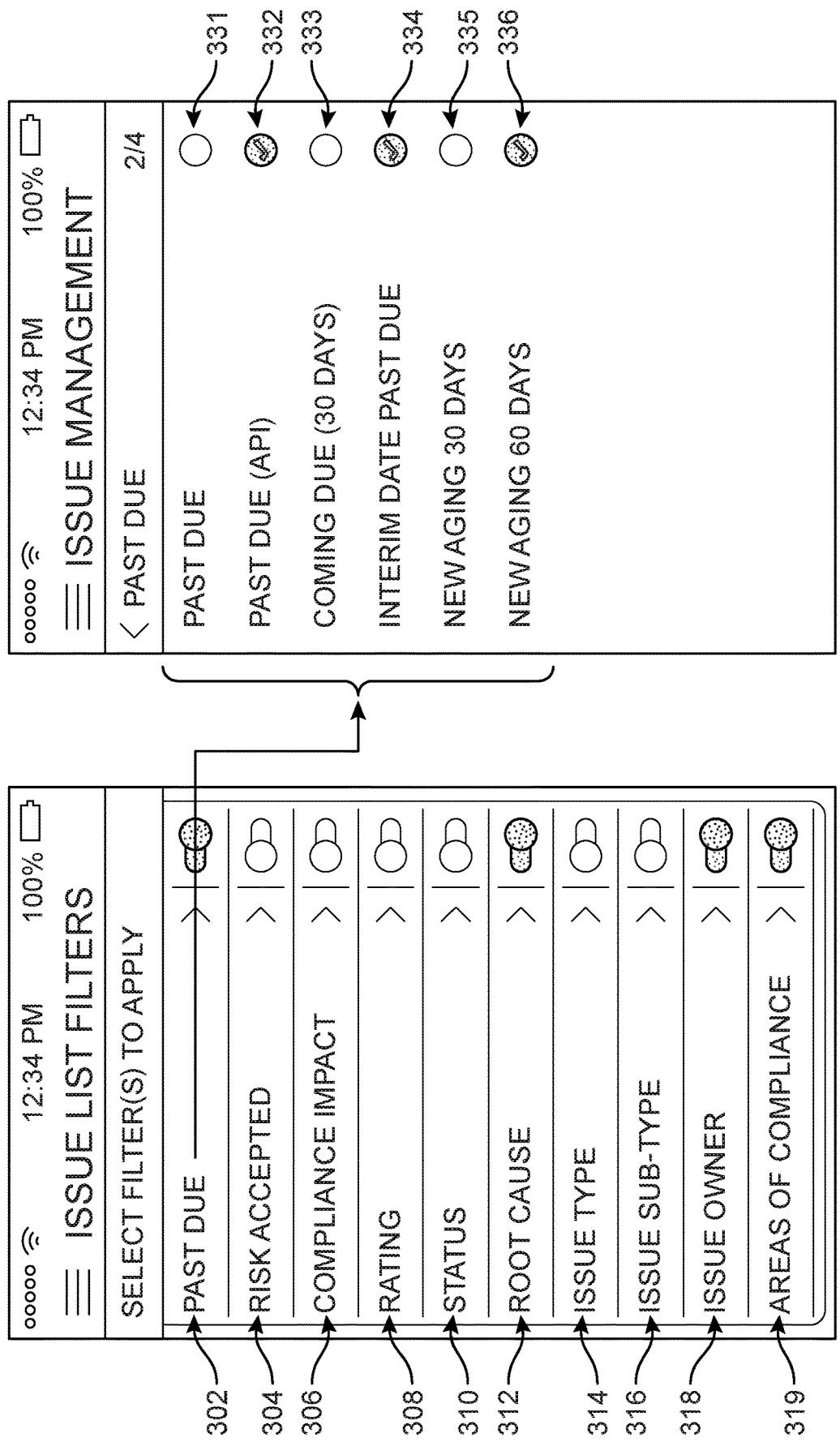
FIG. 3 is a schematic view of a client menu for selecting filtering parameters, according to an embodiment.
Figure 4:
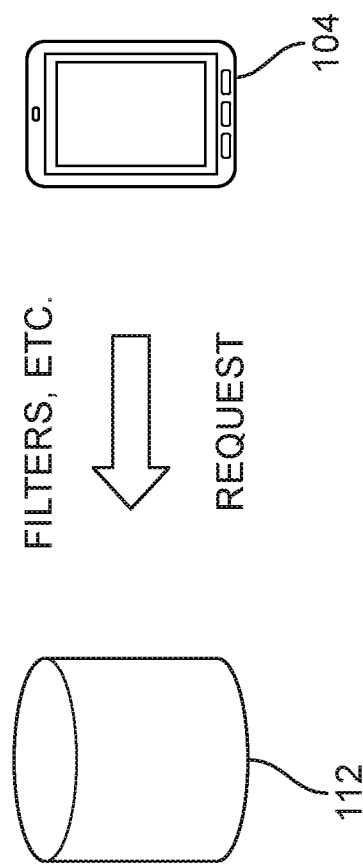
FIG. 4 is a schematic view of a request made from a client to a server-side database.
Figure 5:
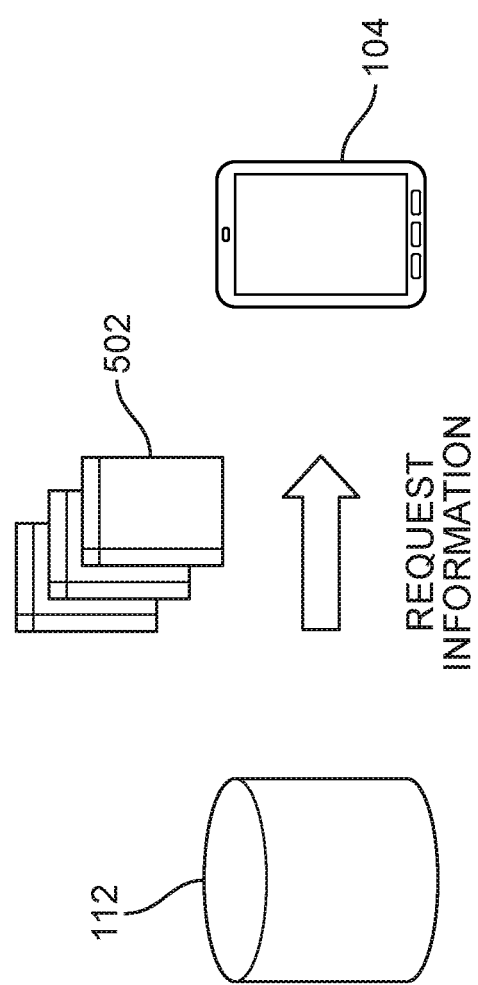
FIG. 5 is a schematic view of a response from the server based on the request of FIG. 6, according to an embodiment.

FIG. 2 is a schematic view of a process in which a user of the system makes a query from a client 200 (for example, software running on remote device 104) to the server/database 201 (for example, computer system 102). FIGS. 3-6 show schematic views of system 100 during some of these steps. Although FIGS. 3-6 depict communication between remote client 200 and database 112, it may be appreciated that this communication may be mediated by computing device 110 on the server-side of the system. Moreover, the communication may take place over a network (such as network 106 of FIG. 1).

In a first step 202, client 200 receives one or more user-selected filtering parameters. To select filtering parameters, a user may click on filtering menu 150 (shown in FIG. 1). In response, client 200 displays a detailed list of filters (or filtering parameters), as shown schematically in FIG. 3. This may include a past due filtering parameter 302 that selects for issues that are past due. The filtering parameters may also include a risk accepted filtering parameter 304 that filters issues according to the issue's risk profile. The filtering parameters may also include a compliance impact filtering parameter 306 that filters for issues that are relevant for compliance. The filtering parameters may also include a rating filtering parameter 308 that selects for issues with a specific rating (or importance) level. Rating levels could include: "low", "medium", "high" and "critical". For example, if a user wants to look for any issues that need to be taken care of right away they may set the rating filtering parameter to "high," or "critical," thereby ignoring issues of lesser importance.

Generally, each filtering parameter could include both a selection menu for choosing specific values for each filtering parameter as well as a toggle switch for turning the filtering parameter on or off. As one specific example, the past due filtering parameter 302 may have a selection menu that allows a user to choose one or more of several past due values. These include turning on and off values such as "Past Due" (selection 331), "Past Due (API)" (selection 332), "Coming Due (30 days)" (selection 333), "Interim Date Past Due" (selection 334), "New Aging 30 days" (selection 335) and "New Aging 60 days" (selection 336). It may be appreciated that the other filtering parameters discussed above may also have a similar list of values that can be selected for filtering.

The filtering parameters may also include a status parameter 310 that is associated with the current status of the issue. Examples of issue statuses (or status values) include, but are not limited to: "New", "Pending Review," "Pending Approval," "Open," "Action Plan Implementation," "Remediated," "Pending Final Approval," and "Closed." Of course other embodiments need not be limited to this list of possible issue status values, and suitably selected status values could be used for other issue management workflow processes according to the types of issues being managed and/or according to the organization implementing the processes.

Still other filtering parameters could include a root cause filtering parameter 312, an issue type filtering parameter 314, an issue sub-type filtering parameter 316, an issue owner filtering parameter 318, and an areas of compliance parameter 319. These filters can further facilitate narrowing down the search space for any queries based on whether the user is looking for certain types of issues, issue causes and/or issue owners.

Referring back to the process depicted in FIG. 2, in step 204, client 200 may generate a request for database information based on the user-selected filtering parameters received in step 202. The request may also be based on user-selected preferences (for example, preferences received from selections in preferences menu 151 of FIG. 1). In step 206, client 200 sends a request to server 201, as depicted schematically in FIG. 4.

At step 208, server 201 receives the request from client 200. Next, in step 210, server 201 retrieves the requested information from a database (for example, database 112). The requested information may be any information related to the filtering parameters, any user-selected preferences, as well as possibly other parameters that help define the scope of the request. In some embodiments, the requested information takes the form of a set of database documents, tables, or entries that are selected based on the filtering parameters and any selected preferences. The requested information could be retrieved using a single call to the database, or may be retrieved over multiple calls to the database. Once the requested information has been retrieved, server 201 may send the requested information to client 200 during step 212. This step is shown schematically in FIG. 5, with several database tables 502 being transferred from database 112 to remote device 104.

Figure 6:
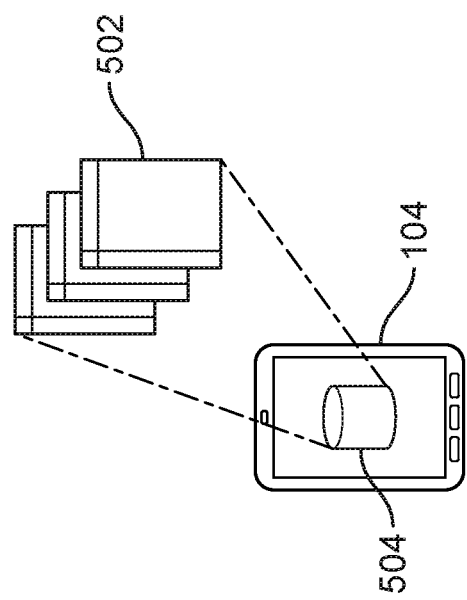
FIG. 6 is a schematic view of a partial database built from the response of FIG. 7, according to an embodiment.

After receiving the requested information in step 214, client 200 may use the requested information to construct (or, refresh) a partial database 504 stored on client 200 in step 216 (see FIG. 6). That is, a copy of some information from the database that is stored locally on the client side of the system (for example, on remote device 104). As used herein, the term "partial database" refers to a subset of the information contained in the database. A partial database may have the structure of a database, including, for example, database tables. However, partial database has fewer database entries (for example, issue records) than the complete database that is located "server-side." That the partial database is smaller than the server-side database is important because an issue management database for a large organization may generally too large to be stored and managed locally on a client device like a mobile phone. In step 218, client 200 may display the results for the user query. For example, client 200 may display the information in results field 156 as in FIG. 1.

In a next step 220, a new user query is received by the client. Conventional systems would operate by repeating the process of submitting a request to the server and waiting for a response. However, because the present embodiment provides a system where a partial database is stored locally, client 200 is able to perform the new user query locally in step 222, without having to make a new call to server 201 (and ultimately, database 112). The updated search results can then be displayed for the user.

Databases of the embodiments can be configured with various kinds of database structures. Examples of different database structures that could be used include, but are not limited to: relational database management systems and non-relational database management systems. Relational database management systems may use database tables with a fixed schema for storing attributes and data types for the tables. By contrast, non-relational database management systems may not have fixed schemas for storing data. Examples of non-relational database management systems include key-value stores, wide column stores, document stores and graph databases. Databases may or may not make use of Structured Query Language (SQL) for reading, creating, updating and deleting data.

In some embodiments, a partial database (such as partial database 504 of FIG. 6) could have a similar database structure to an issue management database (such as database 112). In some cases, a partial database could be a clone of an issue management database, only with less data (entries). In other embodiments, a partial database could have a different database structure than an issue management database. For example, the issue management database could be a relational database such as MySQL, while the partial database could be a document store or file based system.

Figure 7:
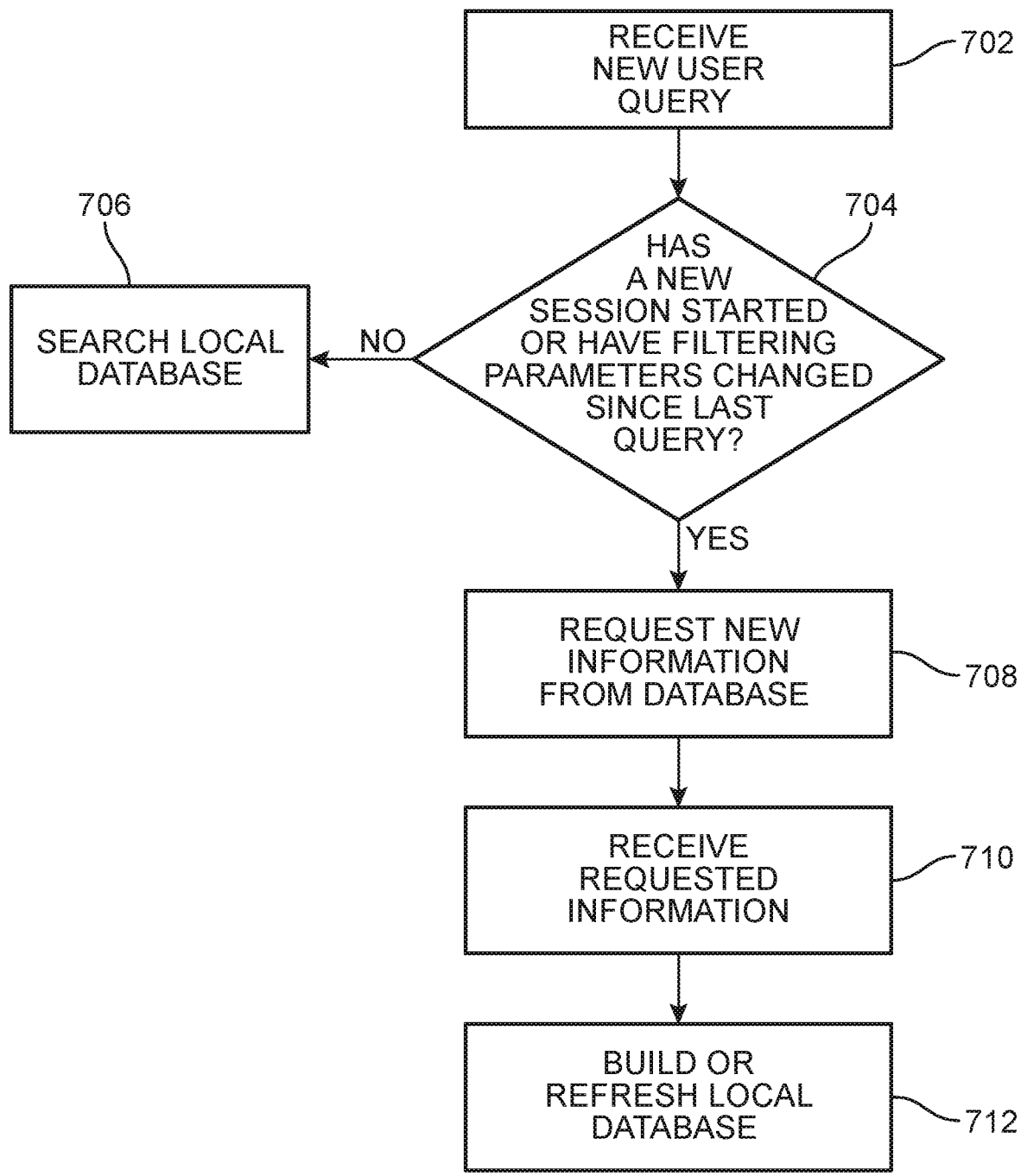
FIG. 7 is a schematic view of a process for refreshing a partial database, according to an embodiment.

The embodiments use filtering parameters to constrain the amount of information from the server-side database that is retrieved and copied locally. In this way, the filtering parameters serve as an initial filter on the universe of information that the user would like to search through. Because of this, anytime the user updates the filtering parameters and/or a new search session is started, the system may rebuild or refresh the partial database that is stored locally. As seen in FIG. 7, for example, after a new user query is received in step 702, client 200 may check to see if a new session of the application has started, or if the filtering parameters have changed, since the last query during step 704. If no new session has started and the filtering parameters have not been updated, client 200 proceeds to step 706 to search the locally stored partial database. However, if client 200 determines that either a new session has started or one or more filtering parameters have been changed, then client 200 proceeds to step 708.

In step 708, client 200 may request new information from the database. More specifically, client 200 makes a call to the server to retrieve requested information from the full issue management database 112. This step may be similar to step 206 of the process depicted in FIG. 2. After step 708, client 200 receives the requested information in step 710 and builds or refreshes the local database accordingly in step 712. Step 710 and step 712 may be similar to step 214 and step 216, respectively, of the process depicted in FIG. 2.

System performance and query response time can be affected by the way database entries are stored and processed. For example, in some databases entries may contain functions and/or references to other entries that must be "evaluated" during (or just after) retrieval. As an example, some entries in tables of a database could incorporate functions to be evaluated at the time of retrieval. These functions may reference other entries in the database. This additional step of function evaluation can reduce system performance and increase query response time, especially when a large number of results are returned in a query.

Figure 8:
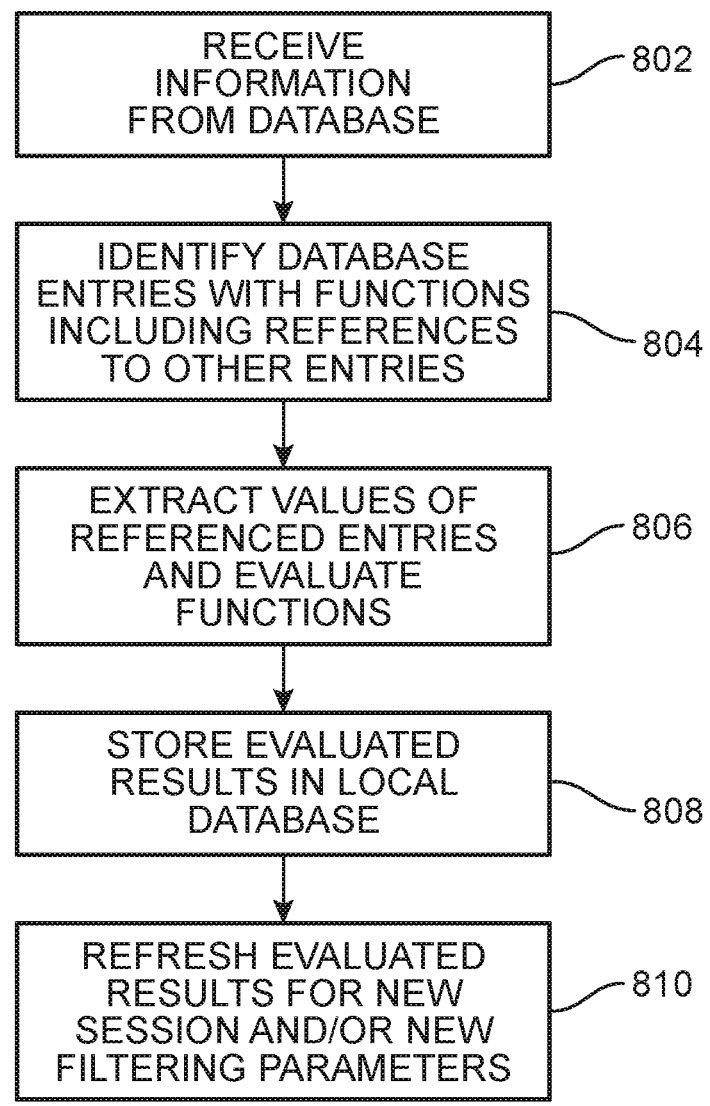
FIG. 8 is a schematic view of a process for storing pre-evaluated functions in a partial database, according to an embodiment.

Referring to FIG. 8, the present embodiments include provisions to pre-evaluate functions or other operations associated with database entries before storing those entries on the client side. In step 802, client 200 may receive information from a database following a request. Next, during step 804, client 200 may identify database entries in the received information that have functions with references to other entries (or, possibly, references to the system environment such as the system clock).

Figure 9:
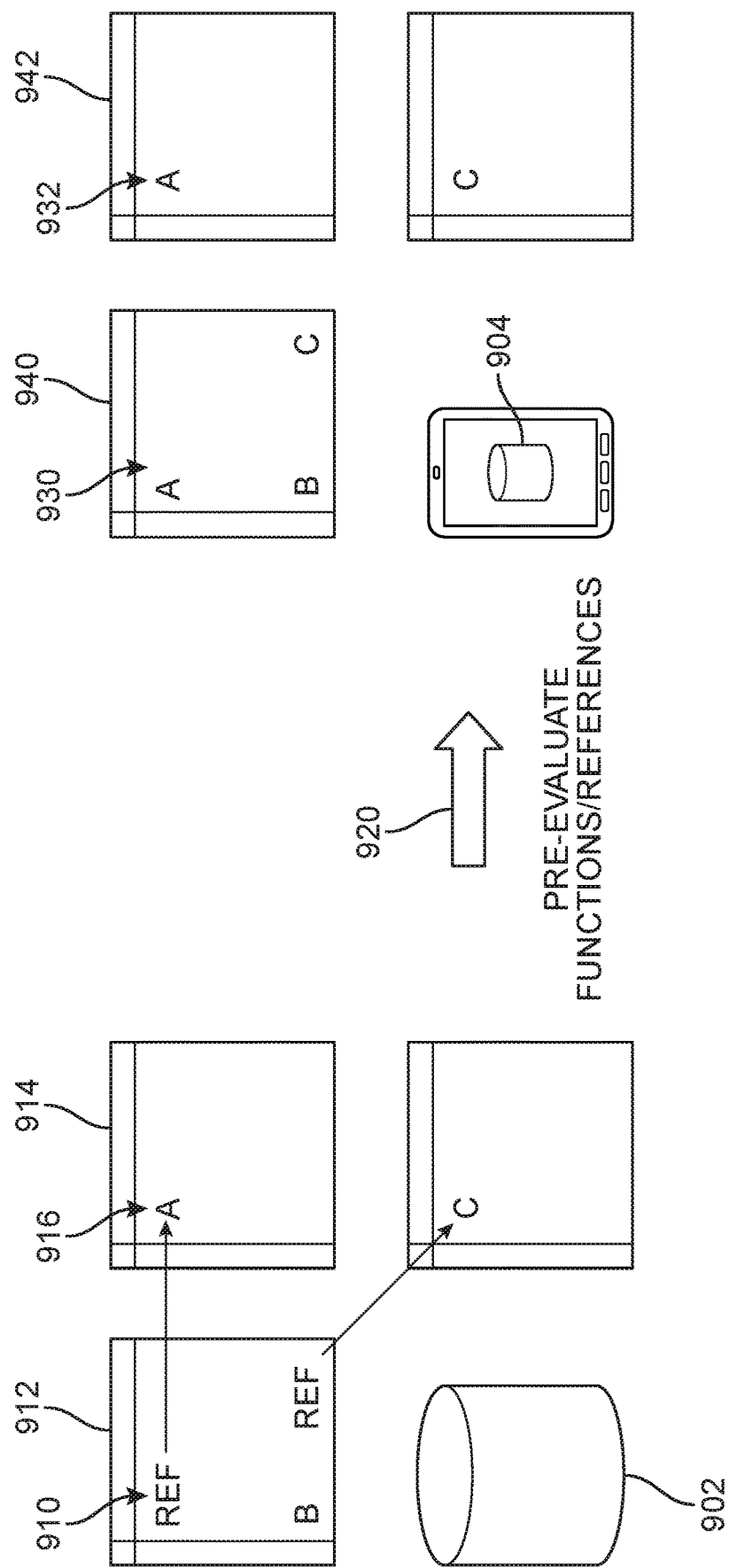
FIG. 9 is a schematic view of relationships between entries in a database and in a partial database.

As an example of databases with references, FIG. 9 depicts a schematic view of data stored in a server-side database 902 and data stored in a client-side partial database 904. On the server-side, database 902 stores some table elements as references to other elements (or as functions relying on references to other elements in their evaluation). For example, table 912 includes a first entry 910 that references a second entry 916 (with value "A") in table 914. While these references simplify data storage they may be more computationally expensive than storing data without references.

Referring again to the process in FIG. 8, in step 806, client 200 may extract the values of the referenced entries and evaluate the functions immediately at the time of retrieval, as indicated by process 920 of FIG. 9. Then, in step 808, the evaluated results from step 806 are stored as entries in the local database. For example, partial database 904 on the client-side in FIG. 9 includes similar tables to database 902. However, the entries are stored without reference to other entries. In particular, the first entry 930 of table 940 in partial database 904 has value A and makes no functional reference to second entry 932 of second table 942 (though all relationships between entry 930 and entry 932 tied together by issue ID).

If any future changes are made to the session status and/or to filtering parameters, the evaluated results can be refreshed at step 810. This last step helps to ensure that the local database entries are not out-of-date when changes are made to entries on the server-side.

In the exemplary process depicted in FIG. 8 evaluation of the database entries (including extracting referenced values) is performed by the client, after requested information has been received from the server. However, in other cases these evaluations could be performed at the server after the requested information has been retrieved. The server could then pass the information to the client with one or more functions/references pre-evaluated.

Because the entries are evaluated prior to being stored in partial database 904, results from future queries to partial database 904 can be returned more quickly than if the entries were stored as functions/references to be evaluated. In some cases, a system could exclude any package utilities making use of functions from queries performed when new filtering parameters are selected.

As discussed above, the embodiments may provide a system and method to improve the usability of an issue management system by calculating relevant metrics on the fly (that is, as a partial database is loaded to the client and/or when results are retrieved from the partial database) to be displayed in a simple and elegant format for the user. More specifically, the system can generate new metrics that are not already available from the issue management database and that generally must be manually determined by a user after reviewing a collection of results.

In the exemplary embodiment, the system is configured to generate the number of days that each issue has spent in a particular lifecycle phase. Lifecycle phases comprise a sequence of phases that an issue passes through during the issue management process. Each lifecycle phase may correspond with one or more issue statuses.

FIG. 10 is a schematic view of a client displaying records for an issue, including a lifecycle phase indicator 1000 (also referred to simply as "indicator 1000") to show details about the lifecycle phases for a given issue. Indicator 1000 provides an intuitive visualization of the number of days that an issue has spent in different phases of the issue management process. In the example depicted in FIG. 10, indicator 1000 includes five phases (or stages): an initiate phase 1002, a plan phase 1004, a mitigate phase 1006, a validate phase 1008 and a closure phase 1010. Each phase is represented by a circular indicia and is either blank or includes a number. The number indicates how many days the issue spent in each phase. A blank indicia indicates that the issue has not reached that phase yet. In some cases, colors can be used to further indicate the difference between previous and current phases.

These lifecycle phases may not be tracked in a server-side database, such as databases 112 of FIG. 1. Instead, they may be calculated on-the-fly and added as new variables to be stored on the client-side database (e.g., partial database 504 of FIG. 6). Lifecycle phases for an issue may be determined by issue status (which is generally stored at the server-side database), date anchors and completion state. In addition to determining the current lifecycle phase, the system may derive the number of days the issue has spent in that phase. In one embodiment, a system could use five distinct lifecycle phases: an "initiate" phase, a "plan" phase, a "mitigate" phase, a "validate" phase and a "closure" phase. Each phase may correspond with one or more issue status values. For example, the "Initiate" lifecycle phase may correspond with the "New", "Pending Review," and "Pending Approval" issue status values discussed above. The "Plan" lifecycle phase may correspond with the "Open" issue status. The "Mitigate" lifecycle phase may correspond to the "Action Implementation" issue status. The "Validate" lifecycle phase may correspond with the "Remediated" issue status. Also, the "Closure" lifecycle phase may correspond with the "Pending Final Approval," and "Closed" issue status values.

Figure 11:
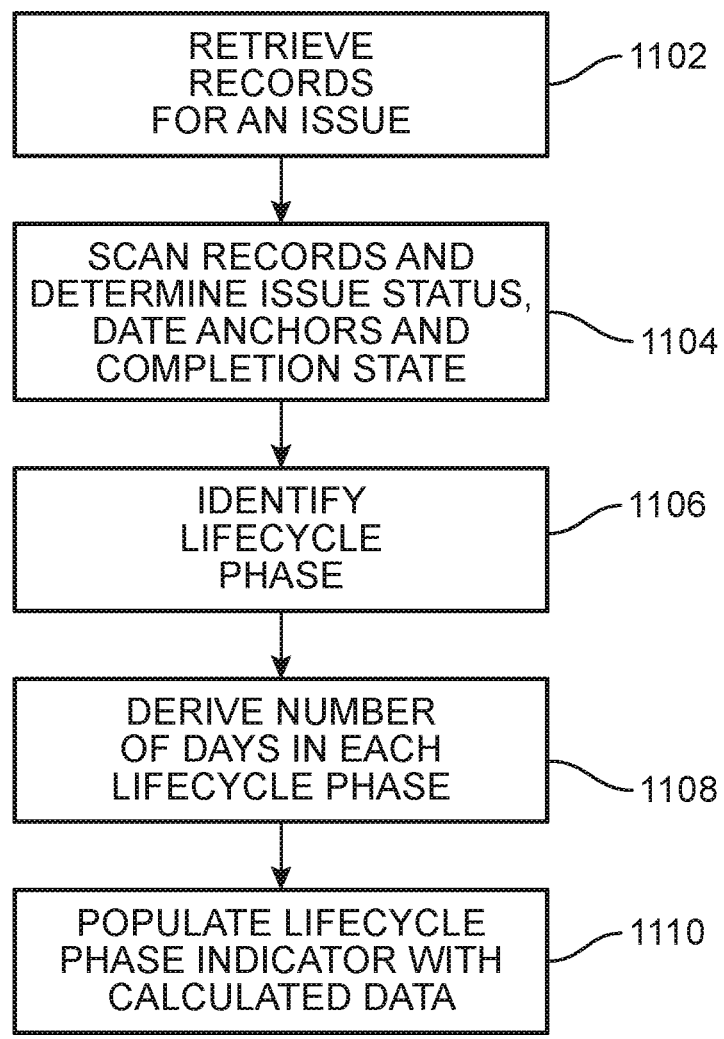
FIG. 11 is a schematic view of a process for generating data for the issue status details of FIG. 10, according to an embodiment.

FIG. 11 is a schematic view of a process for retrieving issue records and determining metrics on the fly to be displayed to a user. In a first step 1102, records are retrieved for an issue. In step 1104, the system scans the records and determines the issue status, date anchors and completion state for the current issue. Following this, in step 1106, the system identifies the current lifecycle phase for the issue based on the information determined in step 1104.

In step 1108, the system derives the number of days the issue spent in each lifecycle phase, based on the information determined in step 1104. The number of days the issue spent in each phase can be calculated and populated in the lifecycle phase indicator in step 1110. Using the information presented in the lifecycle phase indicator, a user may quickly determine where possible chokepoints are in an issue management process so that additional resources can be provided to reduce or eliminate these chokepoints and have the issues resolved faster.

Figure 12:
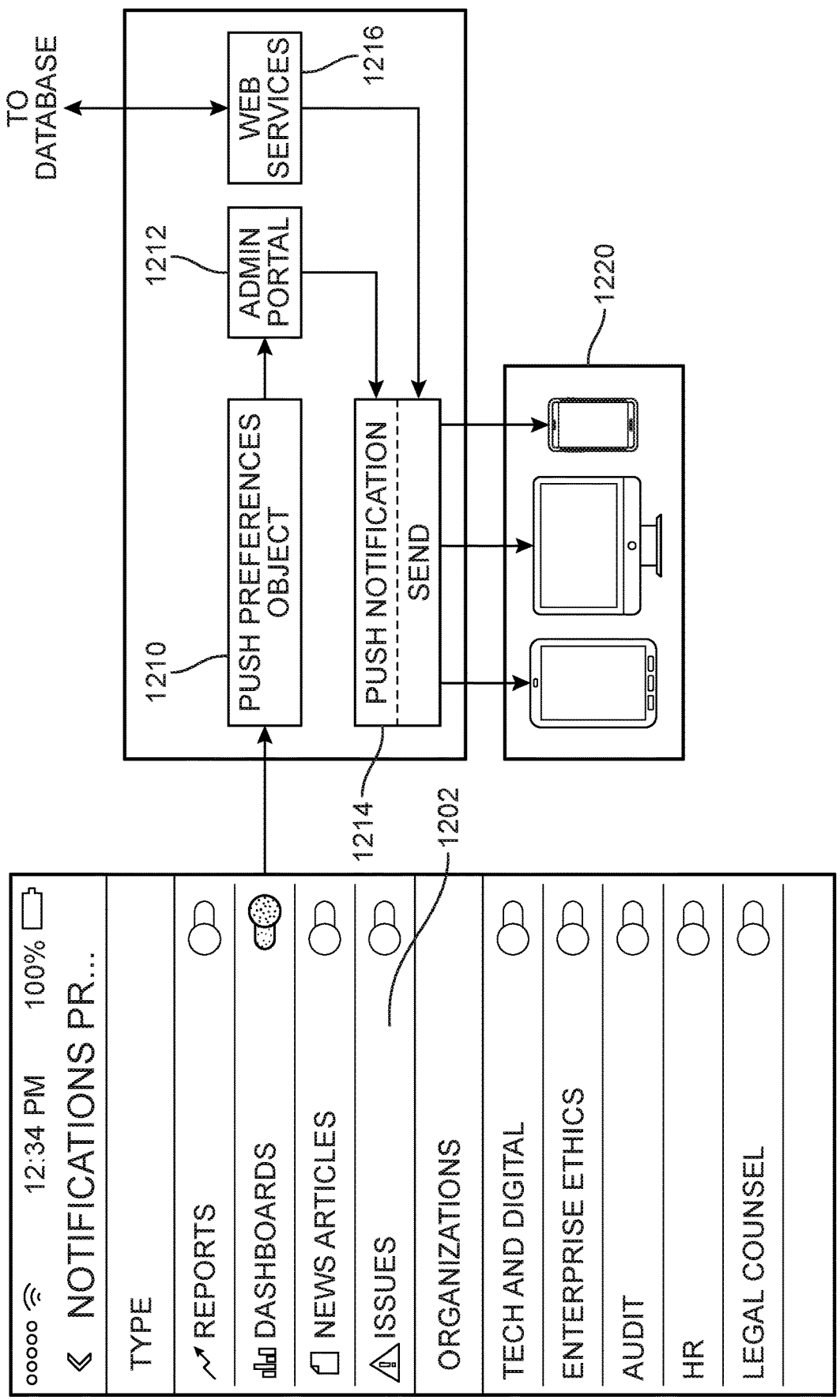
FIG. 12 is a schematic view of a push notification system, according to an embodiment.

Some embodiments can include provisions that facilitate push notifications for issues. FIG. 12 is a schematic view of a push notification system. Push notification preferences can be selected using an issue management mobile application. Referring to FIG. 12, in one embodiment, push notification preferences can include selections for the notification type. In this case, the notification type menu includes an option to select issue based notifications (selection 1202). In some cases, issue based notifications will be sent for issues with a "critical" or "high" rating. In other cases, users can select the rating level at which notifications may be pushed. The user may then select the organizations (e.g., "Tech and Digital", "Enterprise Ethics", "Audit", "HR" and "Legal Counsel") for which they'd like to receive issue notifications.

These preferences are delivered to a push preferences object 1210. Object 1210 is passed to an admin portal 1212, and then to a push notification handler 1214. As an issue database is populated with new issues (or issue updates), a web services module 1216 may pass new issues to the push notification handler 1214 for dispatch to devices 1220.

Some embodiments can also include provisions for collaboration. In one embodiment, a user can send messages to other users, where the messages are tied to a specific issue. This allows users to collaborate directly with one another from within the mobile issue management application.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method of improving the response time for queries to a server-side database from a client running on a remote device, comprising the steps of:
   receiving at least one filtering parameter;
   submitting a request to the server-side database, the request including the at least one filtering parameter;
   receiving a response from the server-side database based on the at least one filtering parameter;
   creating a partial database on the remote device based on the response from the server-side database, the partial database being smaller than the server-side database,
   wherein the step of creating the partial database further includes evaluating a database function immediately at a time of retrieval for a first entry in the server-side database, the database function initially making reference to a second entry in the server-side database, and storing the result of evaluating the database function in the partial database without reference to an entry in the server-side database;
   receiving a database query;
   retrieving results from the partial database based on the database query with a reduced query response time achieved by performing the database query locally, the results including the result of evaluating the database function stored in the partial database;
   retrieving records for an issue;
   calculating a number of days that the issue spent in each lifecycle phase of an issue lifecycle process, wherein the lifecycle process includes an initiating phase, a planning phase, a mitigating phase, a validating phase and a closing phase; and
   displaying the calculated results.

2. The method according to claim 1, wherein the method includes detecting that a new query session has started and updating the partial database in response to the new query session.

3. The method according to claim 1, wherein the method includes receiving a second filtering parameter and updating the partial database using the second filtering parameter.

4. The method according to claim 1, wherein the method includes receiving an initial query and wherein the request to the server-side database includes the initial query.

5. The method according to claim 1, wherein the server-side database is an issue management database, and wherein the at least one filtering parameter is used to select issues that are past due.

6. The method according to claim 1, wherein the server-side database and the partial database have a similar database structure.

7. The method according to claim 1, wherein the server-side database and the partial database have different database structures.

8. The method according to claim 1, wherein the step of retrieving results from the partial database based on the database query includes performing a string regex search on entries in the partial database.

9. The method according to claim 1, wherein the method further includes detecting that the at least one filtering parameter has changed and updating the partial database in response to the changed at least one filtering parameter.

10. The method according to claim 1, wherein the calculating the number of days occurs on-the-fly.

11. The method according to claim 1, wherein the lifecycle phases are stored as variables in the partial database.

12. A method of improving the response time for queries to a server-side database from a client running on a remote device, comprising the steps of:
    receiving at least one filtering parameter;
    submitting a request to the server-side database, the database including a first entry and a second entry, wherein the first entry includes a database function that makes reference to a value stored in the second entry;
    receiving a response from the server-side database based on the at least one filtering parameter;
    evaluating the database function associated with the first entry to obtain a first entry result;
    creating a partial database on the remote device, the partial database including the first entry the partial database being smaller than the server-side database,
    wherein the step of creating the partial database further includes evaluating the database function immediately at a time of retrieval for the first entry in the server-side database, the database function initially making reference to the second entry in the server-side database, and storing the result of evaluating the database function in the partial database without reference to an entry in the server-side database;
    storing the first entry result in the partial database;
    receiving a database query;
    retrieving results from the partial database based on the database query with a reduced query response time achieved by performing the database query locally, the results including the first entry result;
    retrieving records for an issue;
    calculating a number of days that the issue spent in each lifecycle phase of an issue lifecycle process, wherein the lifecycle process includes an initiating phase, a planning phase, a mitigating phase, a validating phase and a closing phase; and
    displaying the calculated results.

13. The method according to claim 12, wherein the server-side database and the partial database have a similar database structure.

14. The method according to claim 12, wherein the server-side database and the partial database have different database structures.

15. The method according to claim 12, wherein the step of retrieving results from the partial database based on the database query includes performing a string regex search on entries in the partial database.

16. The method according to claim 12, wherein the calculating the number of days occurs on-the-fly.

17. The method according to claim 12, wherein the lifecycle phases are stored as variables in the partial database.

18. The method according to claim 12, wherein the first entry is stored in the partial database without reference to the value stored in the second entry.

19. The method according to claim 12, wherein the method includes receiving a second filtering parameter and updating the partial database using the second filtering parameter.

20. The method according to claim 12, wherein the method includes detecting that a new query session has started and updating the partial database in response to the new query session.

* * * * *